Figure 1:
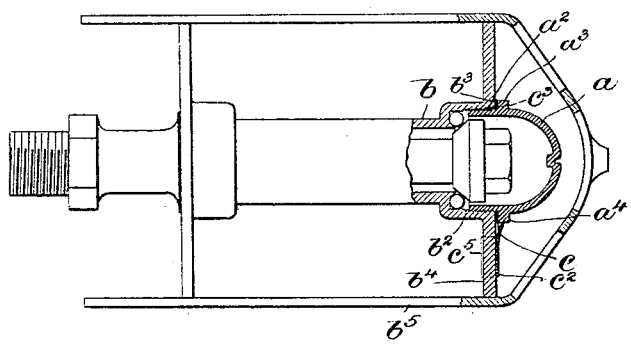

No. 631,054. Patented Aug. 15, 1899.
A. SIDWELL.
DUST CAP FOR BEARINGS.
(Application filed Aug. 29, 1898.)

(No Model.)

Witnesses.

Inventor.
Arthur Sidwell.

UNITED STATES PATENT OFFICE.

ARTHUR SIDWELL, OF WALTHAM, MASSACHUSETTS.

DUST-CAP FOR BEARINGS.

SPECIFICATION forming part of Letters Patent No. 631,054, dated August 15, 1899.

Application filed August 29, 1898. Serial No. 689,763. (No model.)

*To all whom it may concern:*

Be it known that I, ARTHUR SIDWELL, of Waltham, county of Middlesex, and State of Massachusetts, have invented an Improvement in Dust-Caps for Bearings, of which the following description, in connection with the accompanying drawings, is a specification, like letters on the drawings representing like parts.

The present invention relates to a dust-cap for bearings and a retaining device therefor to prevent the dust-cap from loosening and being lost.

The invention is particularly applicable to dust-caps for bicycle-pedals, which, owing to the constant jarring, are frequently loosened and lost, thus causing much trouble. The device, however, is applicable to any dust-cap which is arranged to be engaged with a member of the bearing by being turned or rotated with relation thereto—in cases, for example, where the dust-cap is screw-threaded or provided with a bayonet-joint or similar fastening device.

The device embodying the invention comprises, essentially, a locking finger or projection arranged to engage a portion of the dust-cap, which is provided with a milled or roughened surface, the said finger being adapted to engage the dust-cap when in its normal position, but to be pressed out of engagement therewith when it is desired to remove the cap. The locking-finger is arranged to be held stationary with relation to the member of the bearing to which the dust-cap is applied and is mainly held in position by the dust-cap itself.

The device embodying the invention is herein illustrated as applied to a bicycle-pedal having a dust-cap secured, as by a screw-thread, to the outer member of the bearing or hub of the pedal. The locking device is shown as consisting of a spring-finger projecting from a metallic plate, having an annular portion arranged to surround the threaded projection of the dust-cap and to be held in position between the flange on said dust-cap and the end of the hub or bearing member to which the dust-cap is secured. To prevent the said finger from rotation with relation to the bearing member, it is provided with an engaging portion to engage said bearing member, so that the finger is held stationary and is thereby adapted to prevent the dust-cap from turning and becoming accidentally removed from the bearing. The said finger is further shown as so arranged that in turning the dust-cap to secure the same in position the milled surface thereof will travel past the finger with a ratchet action, but will be prevented from rotation in the opposite direction thereby. To remove the dust-cap, however, the finger can be dressed out of engagement therewith and the dust-cap turned or unscrewed.

Figure 2:
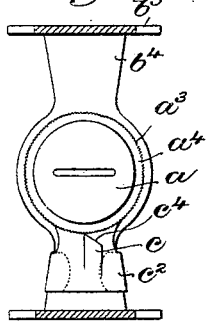
Figure 3:
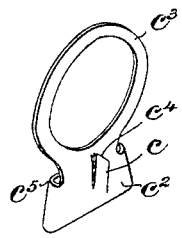
Figure 4:
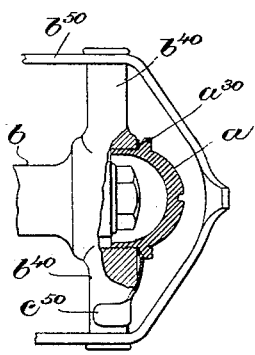
Figure 5:
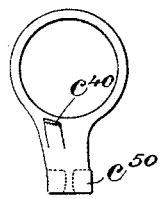
Figure 6:
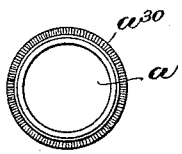

Figure 1 is a sectional elevation of a bicycle-pedal having the dust-cap and locking device embodying the invention applied thereto. Fig. 2 is an end elevation of the pedal with the tread-plate in section to show the locking device, which is mainly behind the main portion of said tread-plate. Fig. 3 is a perspective view of the locking device itself. Fig. 4 is a partial sectional view of a bicycle-pedal, showing a modification of the locking device. Fig. 5 is a plan view of the locking device shown in Fig. 4, and Fig. 6 is an underneath plan view of the dust-cap shown in Fig. 4.

The dust-cap $a$, which may be of any suitable or usual construction, is herein shown as the kind ordinarily applied to a bicycle-pedal and adapted to be secured in the outer bearing member or hub $b$ by a rotary movement, the said dust-cap being herein shown as provided with a screw-thread $a^2$, coöperating with an internal thread $b^2$ in the hub $b$. The said cap $a$ is locked or retained in position, after being properly secured to the bearing member, by means of a spring-finger $c$, arranged to be held stationary with relation to the bearing member which has the dust-cap secured to it and to engage a roughened or milled surface $a^3$, which is shown as formed along the edge of the flange $a^4$ on the dust-cap at the end of the threaded portion, which serves as a shoulder or screw-head.

The spring-finger $c$ is herein shown as formed integral with a flat metallic plate $c^2$, having an annular portion $c^3$, which is arranged to lie between the shoulder $b^3$ of the pedal and the flange $a^4$ of the dust-cap. The retaining device, therefore, is firmly held in position by the dust-cap itself, and the spring-finger c is bent away from the body of the plate, so that it engages with the milled edge $a^3$ of the dust-cap. As shown in Figs. 2 and 3, the said spring-finger has an inclined surface $c^4$, so that it terminates in a point which projects into engagement with the milled portion $a^3$, the opposite side of the finger being substantially perpendicular to the milled surface, so that while the dust-cap will ratchet by when being turned in the direction to fasten the same it will be prevented from rotation in the opposite direction.

To lock the spring-finger or hold the same stationary with relation to the bearing member to which the dust-cap is applied, the plate $c^2$ is herein shown as provided with engaging projections $c^5$, arranged to engage a portion of the said bearing member. As herein shown, the said projections $c^5$ are arranged to be bent around the arms $b^4$, which support the tread-plate $b^5$ of the pedal, it being obvious, however, that the locking device may be otherwise secured to the bearing member in other types of bearings.

In Fig. 4 the locking device is shown as applied to a somewhat different style of pedal, in which the arms $b^{40}$, which support the tread-plate $b^{50}$, are round or oval in cross-section instead of flat, as in the construction shown in Fig. 1. In this case the engaging portion $c^{50}$ may be bent to conform to the shape of the arms $b^{40}$, thus preventing the spring-finger from movement with relation to the pedal-hub, as before.

As shown in Figs. 4 and 5, the spring-finger may be modified in shape, the dust-cap $a$ having a beveled surface $a^{30}$, which is milled, the spring-finger being arranged to project under the said surface and being itself provided with teeth $c^{40}$, arranged along an inclined surface shaped to follow the periphery of the milled beveled portion $a^{30}$ of the dust-cap. As best shown in Fig. 5, the said finger is inclined in the direction in which the dust-cap is rotated to secure the same in position so that the said dust-cap will ratchet by while being secured, but will be prevented from rotation in the other direction.

In the construction shown the locking device can be stamped from a single piece of sheet metal, the spring-finger being cut through the same and then bent away from the adjacent surface, while the engaging portion $c^5$ can be bent to the proper shape to engage the bearing member. The said spring-finger therefore will normally stand in engagement with the dust-cap, as described, but can be easily pressed back out of engagement therewith if the dust-cap is to be removed.

While the construction shown and described to illustrate the invention is practicable and simple, it is not intended to limit the invention to such specific construction and arrangement, since modifications may obviously be made without departing from the invention. Furthermore, while the device is especially useful in connection with bicycle-pedals it is not intended to be limited to such use, since it is obviously applicable to dust-caps employed with bearings of any kind where they are liable to shake loose and be lost.

I claim—

1. The combination with a dust-cap for bearings having an annular flange with a beveled edge which is provided with teeth or engaging portions, said dust-cap being adapted to be secured to one member of the bearing by being turned with relation thereto; of a locking device having an annular portion adapted to be clamped between said flange and said bearing member, and a portion projecting laterally from said annular portion and being connected with said bearing member; and a spring-finger inclined upward from said projecting portion and extending toward the teeth on the annular flange aforesaid, to engage therewith, substantially as described.

2. The combination with a dust-cap for bearings having an annular flange provided with teeth or engaging portions formed along its periphery, said dust-cap being adapted to be secured to one member of the bearing by being turned with relation thereto; of a locking device having an annular portion adapted to be clamped between said flange and said bearing member, and a portion projecting laterally from said annular portion and being connected with said bearing member; a spring-finger integral with the said projecting portion; and an inclined engaging surface on said spring-finger adapted to engage the annular flange aforesaid and prevent the dust-cap from being turned in one direction without preventing it from being turned in the other, substantially as described.

3. The combination with a bicycle-pedal having a hub provided with lateral arms to support the tread-plate, the said hub being provided at one end with an internal screw-thread; of a dust-cap having a portion provided with an external screw-thread, and a flange projecting beyond the threaded portion and having a beveled edge provided with teeth or engaging portions; and a locking device for said dust-cap having an annular portion adapted to lie between said flange and the end of the hub; a projection adapted to be connected with one of the cross members aforesaid; and an integral spring-finger adapted to project outward and engage with the said teeth, substantially as described.

In testimony whereof I have signed my name to this specification in the presence of two subscribing witnesses.

ARTHUR SIDWELL.

Witnesses:
H. J. LIVERMORE,
NANCY P. FOOD.